US008160444B2

(12) United States Patent
Tyler et al.

(10) Patent No.: US 8,160,444 B2
(45) Date of Patent: Apr. 17, 2012

(54) APPARATUS AND METHOD FOR SELECTING AND PASSING AN OPTICAL WAVELENGTH FROM AN AGGREGATE OPTICAL SIGNAL

(75) Inventors: Rich Tyler, Sanbornton, NH (US); Brian Watson, Northfield, NH (US); Jianxun Fang, Concord, NH (US)

(73) Assignee: AFL Telecommunications LLC, Spartanburg, SC (US)

( * ) Notice: Subject to any disclaimer, the term of this patent is extended or adjusted under 35 U.S.C. 154(b) by 414 days.

(21) Appl. No.: 11/275,955

(22) Filed: Feb. 7, 2006

(65) Prior Publication Data

US 2007/0183780 A1    Aug. 9, 2007

(51) Int. Cl.
*H04B 10/08*    (2006.01)
*H04B 10/06*    (2006.01)

(52) U.S. Cl. ............ 398/38; 398/9; 398/25; 398/212

(58) Field of Classification Search .......... 398/38, 398/85, 9, 25, 202, 212; 385/88, 92, 93; 356/73.1
See application file for complete search history.

(56) References Cited

U.S. PATENT DOCUMENTS

| 5,333,221 | A | * | 7/1994 | Briggs et al. ............ 385/55 |
| 5,504,608 | A | * | 4/1996 | Neeves et al. ............ 398/79 |
| 6,113,281 | A | * | 9/2000 | Davis ............ 385/73 |
| 2002/0196430 | A1 | * | 12/2002 | May et al. ............ 356/213 |
| 2003/0202741 | A1 | * | 10/2003 | Abushagur ............ 385/24 |
| 2006/0133742 | A1 | * | 6/2006 | Ruegg et al. ............ 385/89 |
| 2006/0171711 | A1 | * | 8/2006 | Ruchet ............ 398/9 |
| 2006/0177222 | A1 | * | 8/2006 | Beller ............ 398/38 |

FOREIGN PATENT DOCUMENTS

JP    03017536 A * 1/1991

OTHER PUBLICATIONS

Etsuji Sugita et al., "SC-Type Single-Mode Optical Fiber Connectors", Nov. 1989, Journal of Lightwave Technology, vol. 7, No. 11, pp. 1689-1696.*
"Instrumentation Catalog 2005, Fiberoptic Instrumentation", Mar. 2005, JDS Uniphase, pp. 1-18, 41-48.*
AFL Telecommunications, "OPM 5 Optical Power Meter", May 2005, pp. 1-2.*

* cited by examiner

*Primary Examiner* — Kenneth N Vanderpuye
*Assistant Examiner* — Daniel Dobson
(74) *Attorney, Agent, or Firm* — Sughrue Mion, PLLC

(57) ABSTRACT

Apparatus, systems and methods for separating a selected optical signal wavelength component from a plurality of optical signal wavelength components of an aggregate optical signal, and for passing the selected optical signal wavelength component while suppressing the remaining wavelength components are provided. Generally, the apparatus provides an optical signal wavelength selective element enabling output of a selectable optical signal wavelength component. The system contains a fiber optic cable carrying an optical signal, an optical signal measurement apparatus to measure optical signal characteristics, and an optical wavelength selector to pass the selected optical signal wavelength component to the optical signal measurement apparatus.

8 Claims, 7 Drawing Sheets

US 8,160,444 B2

APPARATUS AND METHOD FOR SELECTING AND PASSING AN OPTICAL WAVELENGTH FROM AN AGGREGATE OPTICAL SIGNAL

FIELD OF THE INVENTION

The present invention is generally related to optical signals, and more particularly is related to an optical wavelength selector for selecting and passing an optical wavelength from an aggregate optical signal having two or more optical wavelengths.

BACKGROUND

Advances in fiber optic technology have resulted in the ability to transmit multiple optical signals on a single fiber optic cable. Optical signals can be transmitted using different signal wavelengths, where the different wavelengths are combined for transmission through the fiber optic cable. It is sometimes desirable to measure the characteristics, for example the power level, of the individual optical signal components. Presently, there are two primary pieces of test equipment used to distinguish signal characteristics of individual wavelength signals from the mixed wavelength optical signal: the diffraction grating-based optical spectrum analyzer, and the interferometer-based wavelength meter. Both of these pieces of equipment, however, involve sophisticated technology, are bulky and heavy, and are expensive.

When measuring optical signals, an adapter cap is often used as an interface between a fiber optic cable connector and an optical power meter used to measure optical signal power levels. Existing adapter caps are used for measuring aggregated optical signal power levels. In the case of mixed optical signals with more than two optical wavelengths, however, an optical power meter is unable to distinguish the power levels of the optical signals at the individual optical wavelengths using existing adapter caps. Therefore, the above-mentioned bulky and expensive pieces of test equipment are the only alternatives when measurements of individual optical wavelengths are necessary.

Thus, a heretofore unaddressed need exists in the industry to address the aforementioned deficiencies and inadequacies.

SUMMARY

Broadly described, the present invention provides apparatus, systems and methods for separating a selected optical signal wavelength component from a plurality of different optical signal wavelengths of an aggregate optical signal, and for passing the selected optical signal wavelength component while suppressing the remaining wavelength components. Generally, in operation, an aggregate optical signal having two or more optical wavelength components is input to the optical wavelength selector. Using an optical signal wavelength selective element, the optical wavelength selector passes a user-selected optical wavelength component while suppressing the remaining optical components of the aggregate optical signal.

One embodiment of a system, among others, can be implemented as follows. The system contains an optical signal measurement apparatus, an optical wavelength selector connected to the optical signal measurement apparatus, and an aggregate optical signal connected to the optical wavelength selector. The optical wavelength selector selectively passes a wavelength component of the aggregate optical signal to the optical signal measurement apparatus while suppressing the remaining aggregate optical signal wavelength components.

The present invention can also be viewed as providing methods for selecting and passing individual optical signal wavelength components of an aggregate optical signal. In this regard, one embodiment of such a method, among others, can be broadly summarized by: connecting an optical wavelength selector to an optical signal measurement apparatus, inputting an aggregate optical signal to the optical wavelength selector, and selecting the optical wavelength component to be passed by the optical wavelength selector.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
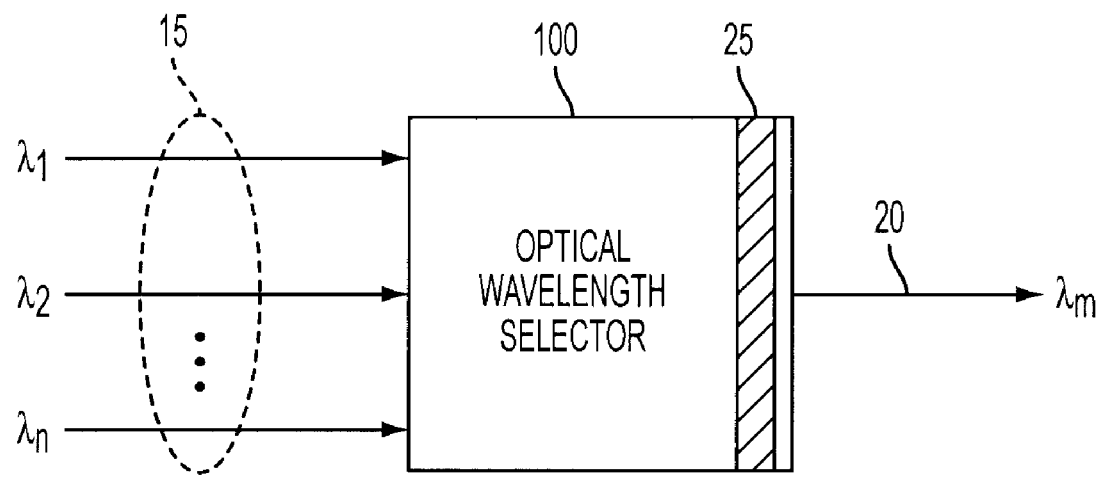
FIG. 1 is a diagram illustrating the operation of an embodiment of the present invention.

FIG. 1 is a diagram illustrating the operation of an embodiment of the present invention. As shown in FIG. 1, an aggregate optical signal 15 having a plurality of optical wavelength components may be input to an optical wavelength selector 100. The optical wavelength selector 100 passes a selected optical wavelength component 20 of the aggregate optical signal 15 while suppressing the remaining optical signal components. To selectively pass an optical wavelength component 20 of an aggregate optical signal 15, the optical wavelength selector 100 may incorporate an optical signal wavelength selective element 25. Embodiments of the optical wavelength selector may incorporate interchangeable wavelength selective elements 25 and/or a plurality of wavelength selective elements 25.

Figure 2:
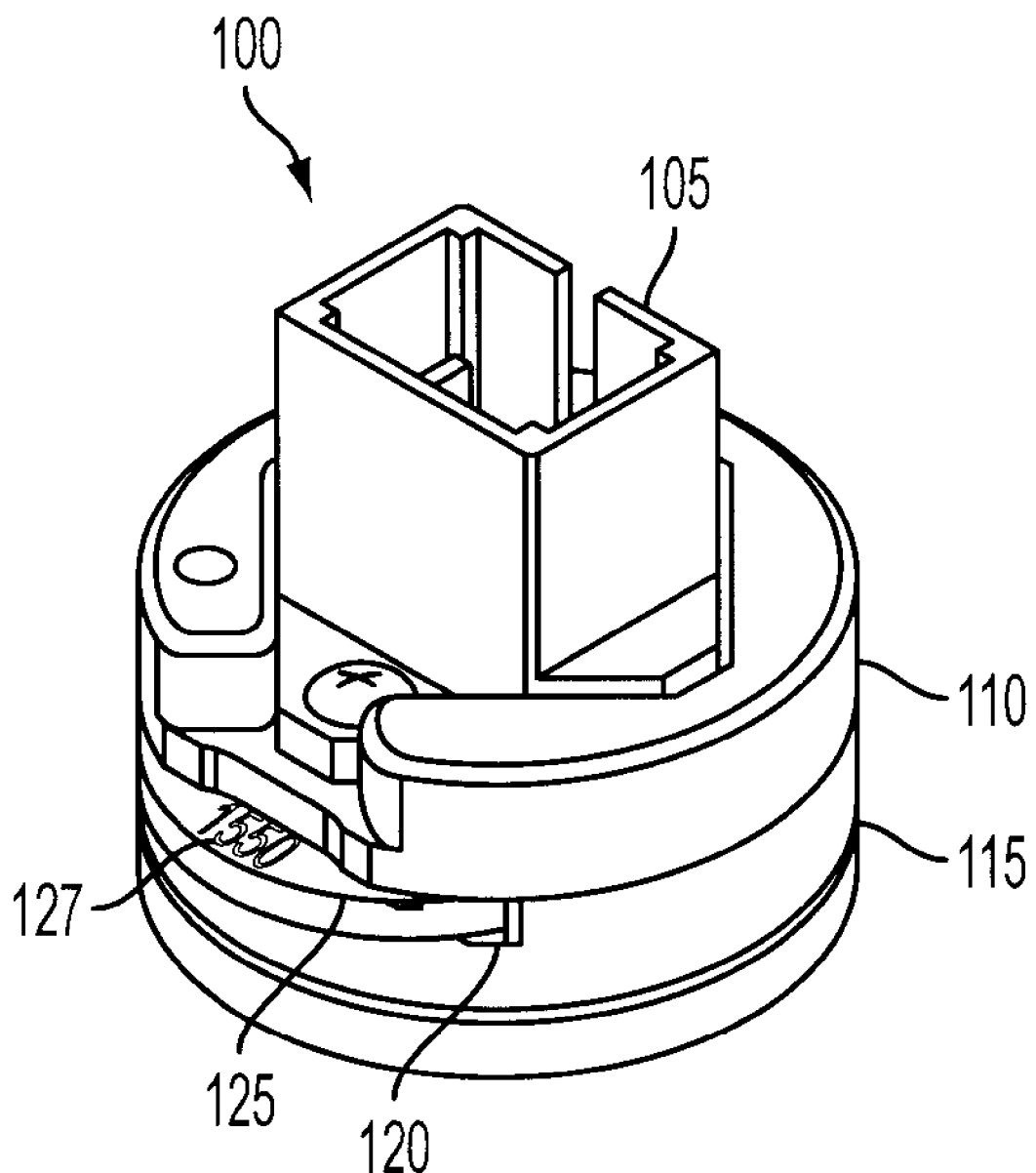
FIG. 2 is a perspective view illustrating a first exemplary embodiment of the optical wavelength selector.
Figure 3:
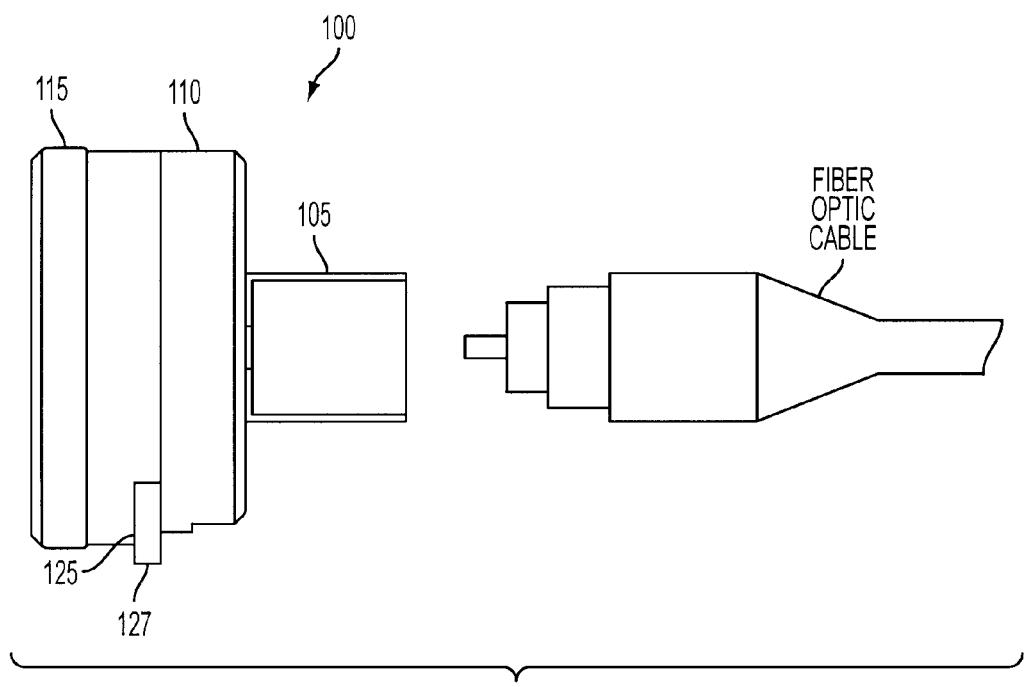
FIG. 3 is a side view illustrating a first exemplary embodiment of the optical wavelength selector.
Figure 4:
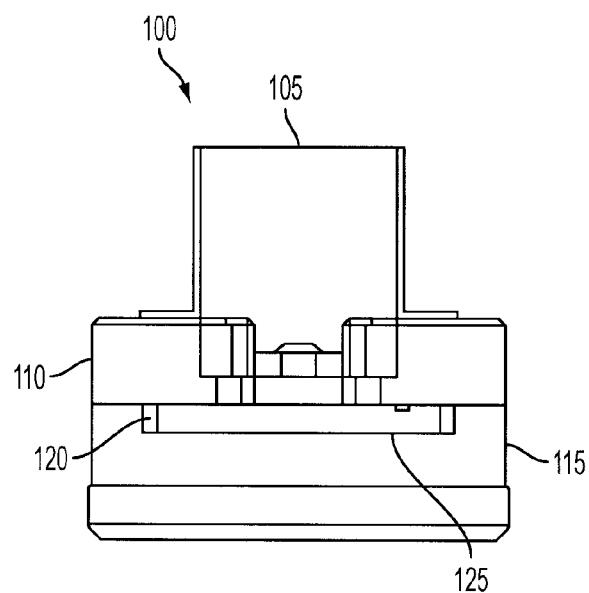
FIG. 4 is a side view illustrating a first exemplary embodiment of the optical wavelength selector.

FIGS. 2, 3 and 4 illustrate a perspective view and side views, respectively, of a first exemplary embodiment of an optical wavelength selector 100. The first exemplary embodiment of the optical wavelength selector 100 may have an optical adapter 105 coupled to a first housing 110, and a second housing 115 coupled to the first housing 110 forming a cavity 120 between the first housing 110, and the second housing 115, with a filter disk 125 at least partially disposed within the cavity 120.

Figure 5:
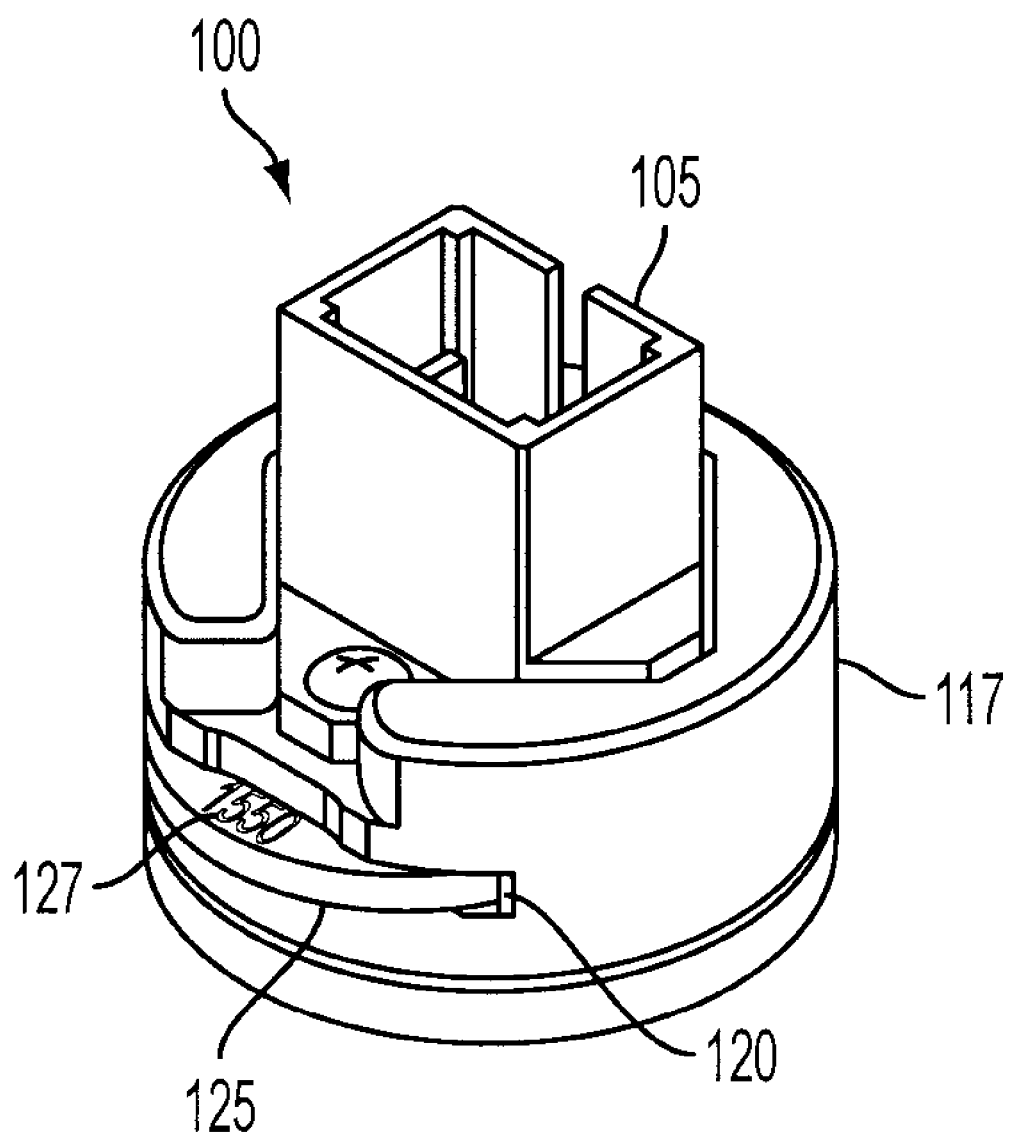
FIG. 5 is a perspective view illustrating an exemplary embodiment of the optical wavelength selector.
Figure 6:
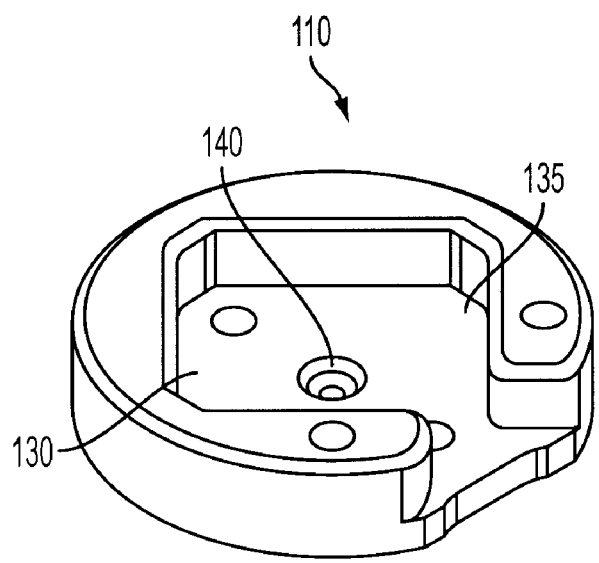
FIG. 6 is a perspective view of a first housing according to a first exemplary embodiment of the optical wavelength selector.

In the first exemplary embodiment, a fiber optic cable may be coupled to the optical adapter 105. The optical adapter 105 may be, for example, but not limited to an SC, FC, ST, LC or universal optical adapter. As illustrated in FIG. 6, the first housing 110 may have a hollow portion 130 arranged to receive the optical adapter 105, and a first surface 135 forming a hole 140 as part of the optical signal path. The optical adapter 105 may be removably coupled to the first housing 110 allowing for interchangeability of optical adapters 105, for example, but not limited to, those exemplified above. In another embodiment, the optical adapter 105 may be formed as part of the first housing 110. A further embodiment may employ a single housing 117 as exemplified in FIG. 5.

Figure 7:
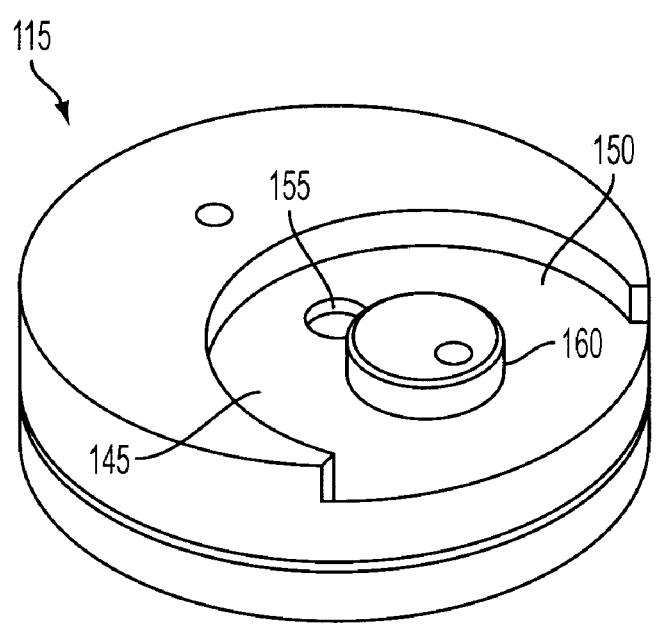
FIG. 7 is a perspective view of a second housing according to a first exemplary embodiment of the optical wavelength selector.

FIG. 7 is a perspective view of a second housing 115 of the first embodiment of the optical wavelength selector 100. The second housing 115 may be constructed as an adapter for connecting an exemplary embodiment of the optical wavelength selector 100 to, for example, but not limited to, an optical power meter. Referring to FIG. 7, the second housing 115 may have a hollow portion 145 and a first surface 150 forming a hole 155 as part of the optical signal path. The first surface 150 may have a hub portion 160 perpendicular to the first surface 150 having a diameter providing a center of rotation for the filter disk 125.

Figure 8:
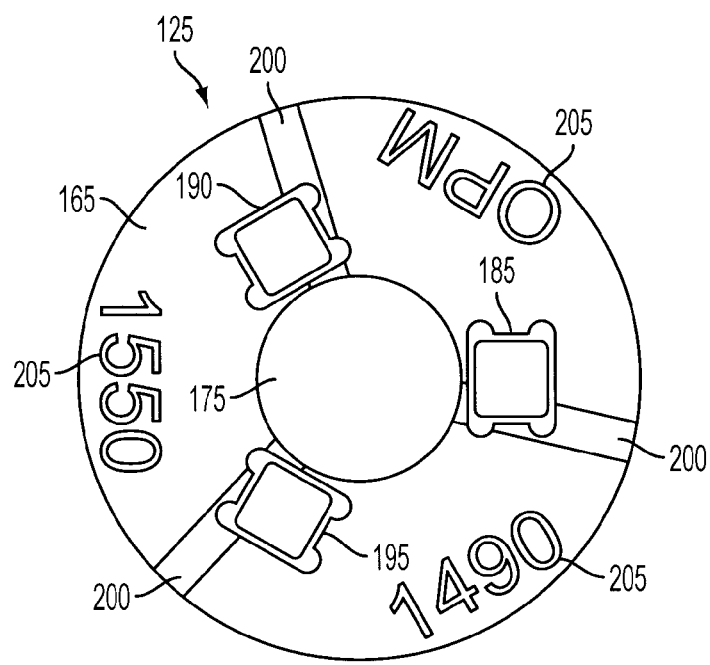
FIG. 8 is a plan view of a first side of a filter disk according to a first exemplary embodiment of the optical wavelength selector.
Figure 9:
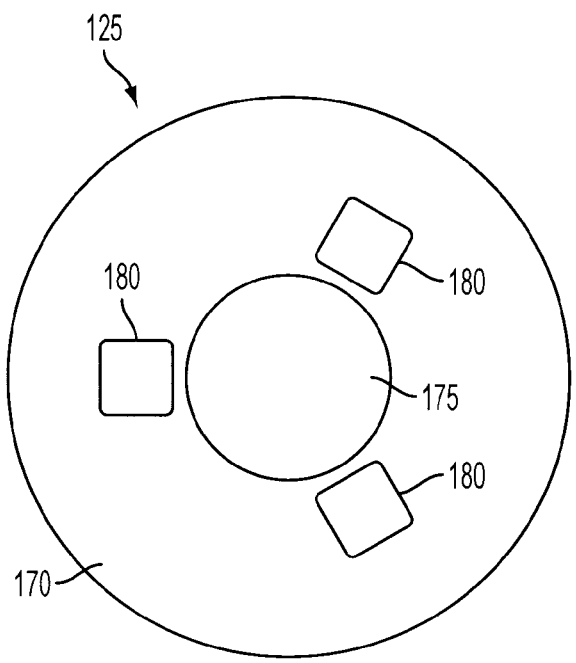
FIG. 9 is a plan view of a second side of a filter disk according to a first exemplary embodiment of the optical wavelength selector.

FIGS. 8 and 9 illustrate a filter disk 125 according to the first exemplary embodiment of the optical wavelength selector 100. The filter disk 125 may have a first circular surface 165 having a first diameter spaced apart from and parallel to a second circular surface 170 having the first diameter, and forming a concentric inner hole 175 having a second diameter through the first circular surface 165 and the second circular surface 170. The second diameter is sized to allow the filter disk 125 to rotate about the hub portion 160 (see FIG. 7) of the second housing 115.

The filter disk 125 may have a plurality of openings 180 extending through the first circular surface 165 and the second circular surface 170. The plurality of openings 180 may be equally spaced around a concentric circle adjacent to the concentric inner hole 175. In the first exemplary embodiment, three openings 180 may be spaced 120 degrees apart around the concentric circumference adjacent to the concentric inner hole 175. The openings 180 are positioned on the filter disk 125 such that one opening 180 at a time may be aligned with the hole 140 in the first housing 110 and the hole 155 in the second housing 115 completing an optical signal path through the optical wavelength selector.

In the first exemplary embodiment, the second housing 115 is constructed to allow the circular filter disk 125 to rotate around the hub portion 160. The filter disk 125 may be constructed in other shapes, for example, but not limited to, square, hexagonal, octagonal and wedge-shaped, having openings 180 correspondingly positioned to complete the optical signal path.

The filter disk 125 may be at least partially disposed within the cavity 120 formed between the first housing 110 and the second housing 115. As illustrated in FIGS. 2 and 3, a protruding portion 127 of the filter disk 125 protruding from the cavity 120 may be used to position the selected opening 180 in the optical signal path.

Referring to FIG. 8, in the first exemplary embodiment, the first circular surface 165 of the filter disk 125 may have a plurality of radial depressions 200 formed in a direction between the outer circumference of the concentric inner hole 175 and the outer circumference of the first circular surface 165 forming detents corresponding to the locations of the openings 180 to properly position the selected opening 180 in the optical signal path.

As illustrated in FIG. 8, thin film optical filters 185, 190, 195 as the optical wavelength selective element may be disposed in the openings 180 of the filter disk 125. Each optical filter 185, 190, 195 may act as an optical bandpass filter having a specified center wavelength. Alternatively, at least one opening 180 may not contain an optical filter, thereby passing the aggregate optical signal. In the first exemplary embodiment illustrated in FIG. 8, the filter disk 125 comprises an opening 180 having an optical bandpass filter 185 with a 1550 nanometer center wavelength, an opening 180 having an optical bandpass filter 190 having a 1490 nanometer center wavelength, and an opening 180 having no optical bandpass filter 195.

As noted above, the protruding portion 127 (see FIGS. 2 and 3) of the filter disk 125 protruding from the cavity 120 may be used to position the selected opening 180, and thereby the selected optical filter 185, 190, 195, in the optical signal path. The filter disk 125 may have markings 205 visible on the protruding portion 127 to indicate which of the optical bandpass filters 185, 190, 195 is positioned in the optical signal path. In the first exemplary embodiment illustrated in FIG. 8, the markings 205 are located directly across the first circular surface 165 from the corresponding optical bandpass filters 185, 190, 195, adjacent the outer circumference of the first circular surface 165. Selecting the optical signal wavelength indicated by the markings 205 on the protruding portion 127 of the filter disk positions the corresponding optical bandpass filter 185, 190, 195 into the optical signal path, thereby filtering the unwanted optical signal wavelength components and passing the selected optical signal wavelength component to the measurement apparatus.

Figure 10A:
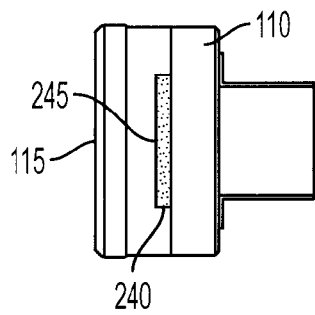
FIGS. 10A and 10B are side views illustrating a second exemplary embodiment of the optical wavelength selector.
Figure 10B:
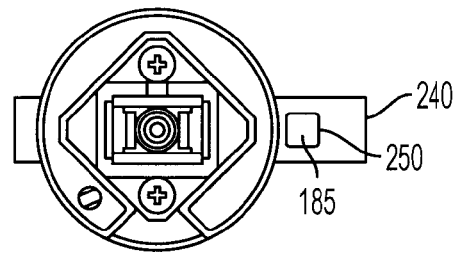

In a second exemplary embodiment illustrated in FIGS. 10A and 10B, optical bandpass filters 185, 190, 195 may be arranged in a linear fashion in openings 250 on a filter block 240 and positioned in the optical signal path by sliding the filter block 240 in a cavity 245 of matching shape formed between the first housing 110 and the second housing 115.

Figure 11:
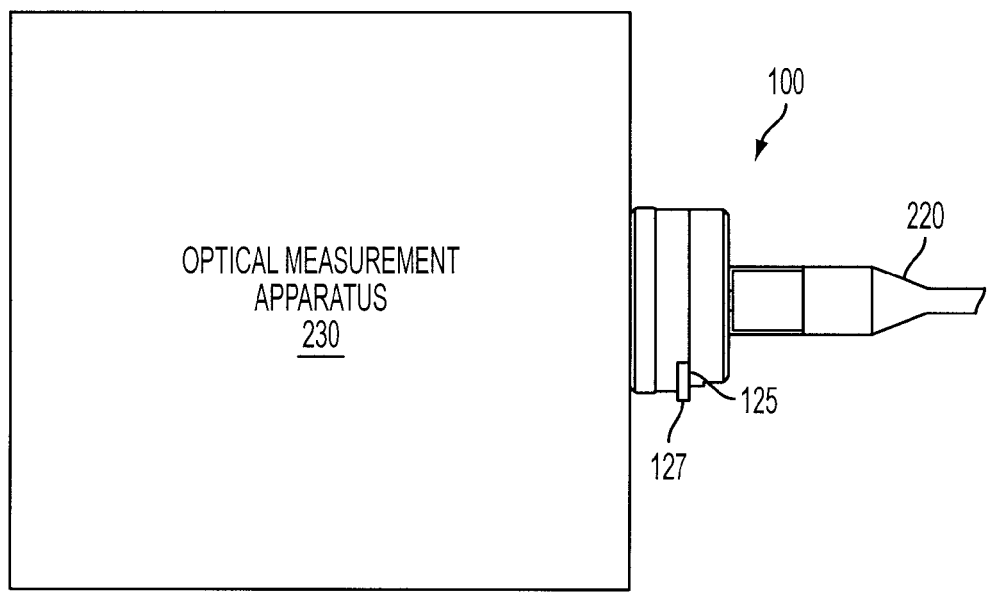
FIG. 11 is a block diagram illustrating a measurement system according to an exemplary embodiment of the present invention.

FIG. 11 is a block diagram illustrating a measurement system according to an exemplary embodiment of the present invention. A fiber optic cable 220 may be connected to an optical signal measurement apparatus 230, for example, but not limited to, an optical power meter, through an optical wavelength selector 100. A measurement of a characteristic of a specific wavelength component of an aggregate optical signal may be made by selecting the specified optical signal wavelength component using the protruding portion 127 of the filter disk 125. In this manner, the specified optical bandpass filter 185, 190, 195 (FIG. 8) is inserted into the optical signal path allowing only the specified wavelength component to be passed to the optical signal measurement apparatus 230.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. An optical wavelength selector, comprising:
a housing disposed between an optical cable output connector and an optical power meter configured for removable external connection used to interface the optical cable output connector to the optical power meter;
at least one selectable optical filter disposed within said housing in an optical signal path between the optical cable output connector and the optical power meter, said housing comprising an output optical connector which removably mates with an input optical connector of the optical power meter,
wherein the at least one selectable optical filter is capable of separating a selected optical signal wavelength component from a plurality of optical signal wavelength components of an aggregate optical signal,
wherein the at least one selectable optical filter is manually operable to pass the selected optical signal wavelength from the optical signal output connector through the at least one selectable optical filter,
wherein the optical cable output connector is detachably connected to said housing through an optical interface adapter,
wherein the at least one selectable optical filter comprises:
a 1490 nanometer wavelength optical bandpass filter;
a 1550 nanometer wavelength optical bandpass filter; and
at least one open air space, wherein the open air space allows passage of an aggregate optical signal, and
wherein the optical interface adapter is interchangeable among a group consisting of an SC adapter, an FC adapter, an ST adapter, an LC adapter, and a universal adapter.

2. An optical wavelength selector, comprising:
a first housing;
an optical interface adapter coupled to the first housing which detachably connects to an optical cable output connector;
a second housing which detachably connects externally to an optical power meter;
a plurality of selectable optical filters disposed between the first housing and the second housing;
wherein the optical interface adapter, the first housing, the second housing and a selected one of the plurality of selectable optical filters form an apparatus to removably connect the optical cable output connector to the optical power meter and pass a selected optical wavelength from the output connector of the optical cable containing one or more optical signal wavelengths to the optical power meter, and
wherein the optical interface adapter is interchangeable among a group consisting of an SC adapter, an FC adapter, an ST adapter, an LC adapter, and a universal adapter.

3. The optical wavelength selector of claim 2, further comprising a filter disk forming a concentric hole, wherein the plurality of selectable optical filters is disposed on a circular surface of the filter disk equally spaced around a concentric circle adjacent to the concentric inner hole.

4. The optical wavelength selector of claim 3, wherein the concentric hole of the filter disk is positioned around a hub allowing the filter disk to rotate such that each of the selectable optical filters can be selectively positioned in the optical signal path.

5. The optical wavelength selector of claim 2, further comprising a filter block disposed between the first housing and the second housing, wherein the plurality of selectable optical filters is disposed linearly along a surface of the block, and wherein each of the selectable optical filters can be selectively positioned in the optical signal path by movement of the filter block.

6. An optical wavelength selector comprising:
a first housing;
an optical interface adapter coupled to the first housing which detachably connects to an optical cable output connector;
a second housing which detachably connects externally to an optical power meter to adapt the optical cable output connector to the optical power meter;
a plurality of selectable optical filters; and
a filter disk forming a concentric hole, disposed between the first housing and the second housing;
wherein the plurality of selectable optical filters is disposed on a circular surface of the filter disk equally spaced around a concentric circle adjacent to the concentric inner hole;
wherein the concentric hole of the filter disk is positioned around a hub allowing the filter disk to rotate such that each of the selectable optical filters can be selectively positioned between the optical cable output connector and the optical power meter to pass a selected optical signal from the optical cable output connector to the optical power meter, and
wherein the optical interface adapter is interchangeable among a group consisting of an SC adapter, an FC adapter, an ST adapter, an LC adapter, and a universal adapter.

7. A system for measuring characteristics of individual optical signal wavelengths of an aggregate optical signal, the system comprising:
an optical signal measurement apparatus; and
an optical wavelength selector comprising a housing having an output optical connector which removably mates externally with an input optical connector of the optical signal measurement apparatus and an optical interface adapter which detachably connects a fiber optic cable to the optical wavelength selector housing;
wherein the optical wavelength selector is manually operable to pass an individual optical signal wavelength of the aggregate optical signal into the optical signal measurement apparatus,
wherein the optical wavelength selector comprises a plurality of selectable optical filters disposed in an optical signal path, wherein the plurality of selectable optical filters further comprises:
a 1490 nanometer wavelength optical bandpass filter;
a 1550 nanometer wavelength optical bandpass filter; and
at least one open air space, wherein the open air space allows passage of an aggregated optical signal, and
wherein the optical interface adapter is interchangeable among a group consisting of an SC adapter, an FC adapter, an ST adapter, an LC adapter, and a universal adapter.

8. The system of claim 7, wherein the optical signal measurement apparatus is an optical power meter.

* * * * *